(12) United States Patent
Abe et al.

(10) Patent No.: US 6,606,898 B1
(45) Date of Patent: Aug. 19, 2003

(54) EXHAUST GAS COMPONENT MEASURING APPARATUS

(75) Inventors: Yoshiharu Abe, Saitama (JP); Keiichi Ohsawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/541,683

(22) Filed: Apr. 3, 2000

(30) Foreign Application Priority Data

Apr. 19, 1999 (JP) .......................................... 11-110584

(51) Int. Cl.⁷ ............................................ G01N 33/497
(52) U.S. Cl. ...................................... 73/23.31
(58) Field of Search ................................ 73/23.31, 116, 73/117

(56) References Cited

U.S. PATENT DOCUMENTS 5,372,035 A  * 12/1994 Ogawa et al. ................. 73/117

FOREIGN PATENT DOCUMENTS

| JP | 5-157666 A | 6/1993 | | |
|----|-----------|--------|---|---|
| JP | 6-12938 U | 2/1994 | | |
| JP | 6-12938 | * 2/1994 | ............ | G01N/1/22 |
| JP | 6-74871 | * 3/1994 | .......... | G01M/17/00 |
| JP | 6-74871 A | 3/1994 | | |
| JP | 6-58343 U | 8/1994 | | |
| JP | 06-58343 | * 8/1994 | .......... | G01M/19/00 |
| JP | 8-159926 | * 6/1996 | .......... | G01M/17/00 |
| JP | 8-159926 A | 6/1996 | | |

* cited by examiner

*Primary Examiner*—Eric S. McCall
*Assistant Examiner*—Maurice Stevens
(74) *Attorney, Agent, or Firm*—Lahive & Cockfield, LLP

(57) ABSTRACT

The exhaust gas component measuring apparatus measures the components of the exhaust gas of a vehicle V while driving the vehicle V in a given driving mode. The apparatus includes driving mode setting means 14 for setting the driving mode of the vehicle V, environment setting means 7, 8 for automatically setting the environment of the vehicle V in accordance with the driving mode set by the driving mode setting means 14, a driving device 3 for automatically driving the vehicle V in such a manner that the vehicle V can be driven in the driving mode set, and measuring devices 11, 13, and 15 respectively for automatically measuring the components of the exhaust gas of the vehicle V as the vehicle V is automatically driven.

16 Claims, 7 Drawing Sheets

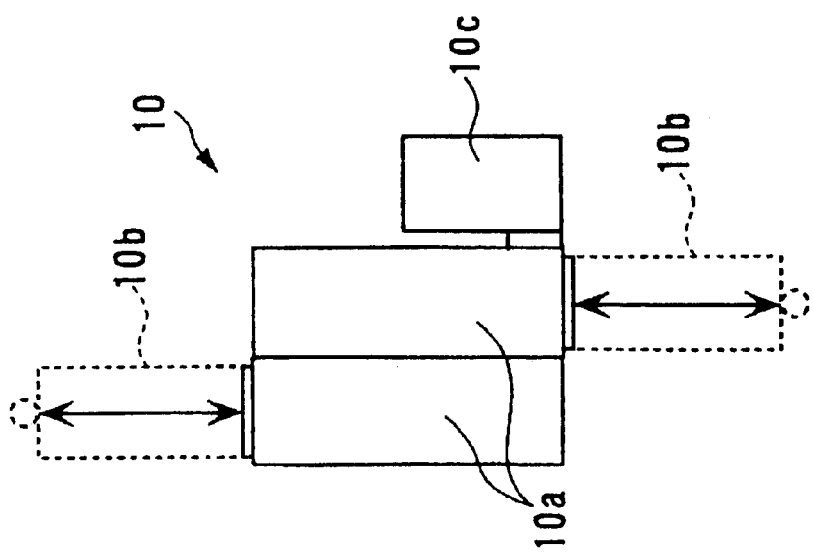
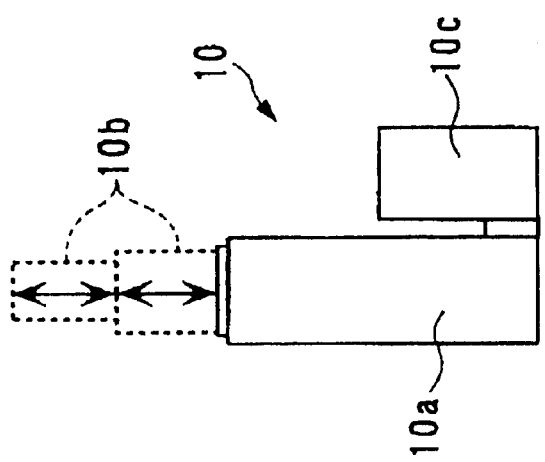
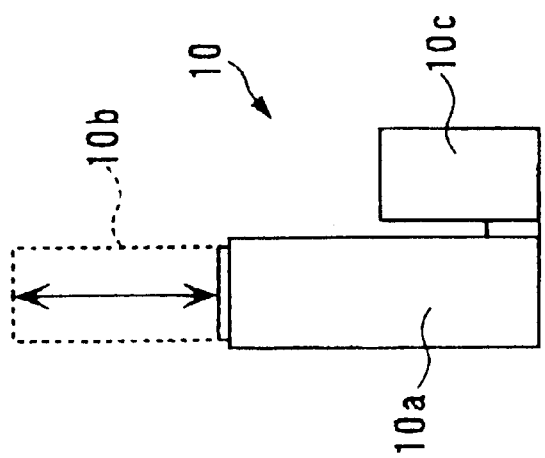

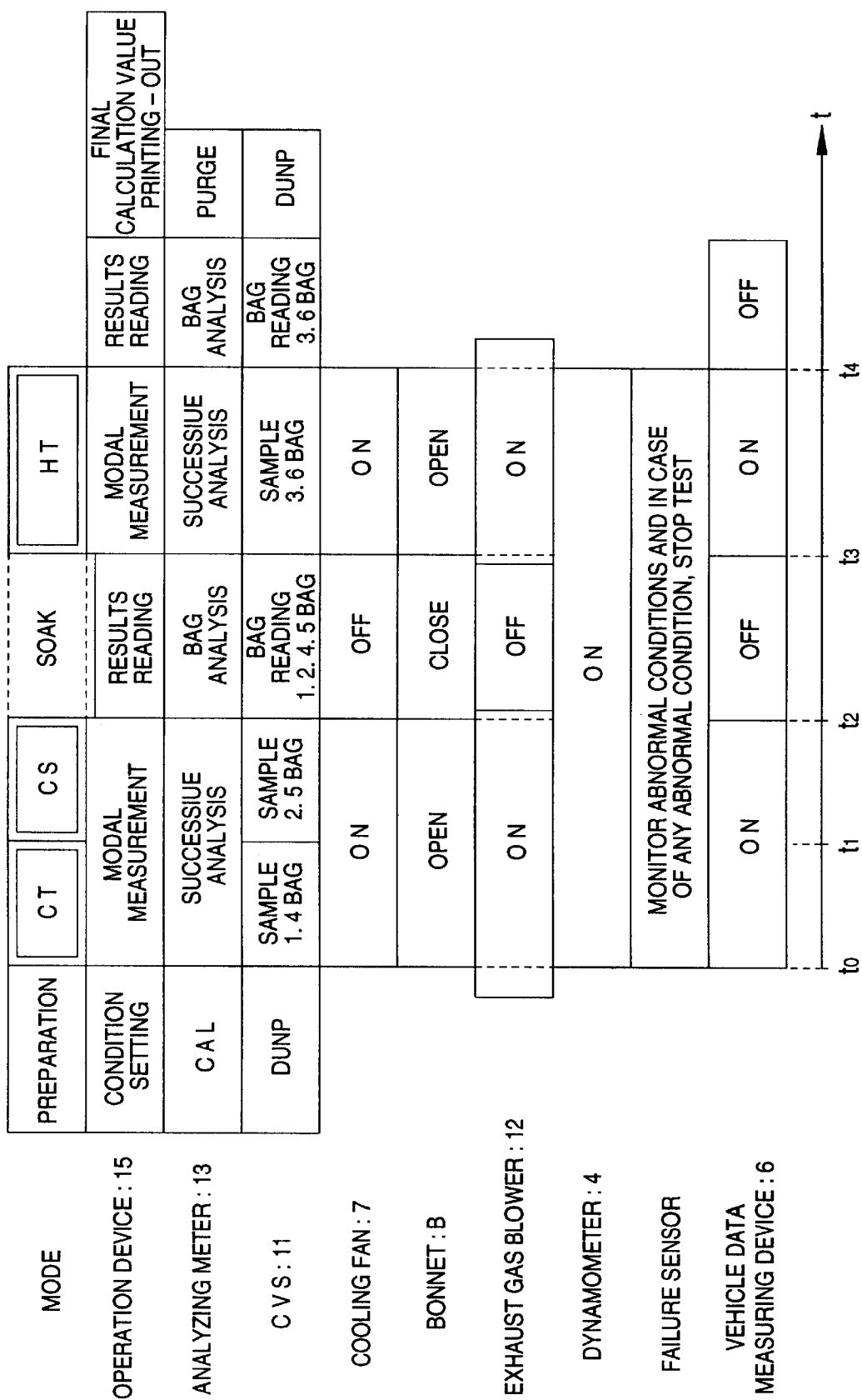

EXHAUST GAS COMPONENT MEASURING APPARATUS

BACKGROUND OF THE INVENTION

1. Field of the Invention

The present invention relates to an exhaust gas component measuring apparatus which measures the components of the exhaust gas of a vehicle while driving the vehicle automatically.

2. Description of the Related Art

FIG. 7 show an example of a conventional exhaust gas component measuring apparatus of this type. This exhaust gas component measuring apparatus 51 is an apparatus which measures the components of the exhaust gas of a vehicle (not shown) while automatically driving the vehicle stored within a housing (not shown) in a given driving mode. The exhaust gas component measuring apparatus 51 comprises a control board 52, and a robot 53 which is disposed within the vehicle. The control board 52 comprises an input key (not shown) through which instructions for specification of kinds of measurement and for start of the measurement can be input, and a microcomputer (not shown). The robot 53 includes an actuator (not shown) for driving the starter and accelerator and, under the control of the control board 52, is allowed to automatically drive the engine of the vehicle in a given driving mode corresponding to the kind of measurement specified. By the way, in FIG. 7, a solid line shows a control system which is carried out by the control board 52, whereas a broken line shows an operation system to be executed by operators.

To the control board 52, there is connected an operation device 54 consisting of a microcomputer; and, to the operation device 54, there are connected a CVS 55 (Constant Volume Sampler) disposed in an exhaust pipe (not shown) of the vehicle and an analyzing meter 56 for the CVS 55. Under the control of the operation device 54, the CVS 55 samples exhaust gas and analyzing meter 56 analyzes the components of the exhaust gas sampled; and, at the same time, the operation device 54 operates the measured results of the components of the exhaust gas using data obtained by the analyzing meter 56.

Further, in the exhaust gas component measuring apparatus 51, in order to set up the environment of the vehicle according to the driving mode of the vehicle, there are disposed a cooling fan 57 for cooling the engine of the vehicle and an insolation device 59 for applying the sun rays to the vehicle, while the cooling fan 57 and insolation device 59, as shown in FIG. 7, can be switched on and off by the operation of the operator. Specifically, the cooling fan 57 is switched on and off according to the driving and stopping of the vehicle, while a bonnet 58 is opened to secure the cooling performance of the cooling fan 57 when the cooling fan 57 is in operation.

Also, the exhaust gas component measuring apparatus 51 further comprises an exhaust gas blower 60 for forcibly exhaust the remaining exhaust gas which has not been sampled by the CVS 55, a dynamometer 61 for carrying thereon the driving wheel of the vehicle to secure the running state of the vehicle, and a vehicle data measuring device 64 for measuring vehicle data such as the number of revolutions of the vehicle engine, while these parts can also be switched on and off by an artificial operation, that is, by the operation of operator. The data on the number of revolutions of the roller of the dynamometer 61 as well as the vehicle data detected by the vehicle data measuring device 64 are respectively transmitted to the control board 52. Further, in case where the exhaust gas component measuring apparatus 51 is in trouble, for example, when it recognizes the blow-out of a tire, or when a failure sensor 62 detects an abnormal condition, the operator stops the driving of the vehicle to thereby stop the measuring operation of the exhaust gas component measuring apparatus 51.

However, in the conventional exhaust gas component measuring apparatus 51, although the driving of the vehicle, sampling and analysis of test pieces, and operation of the measured results can be automatically carried out by the robot 53, CVS 55, analyzing meter 56 and operation device 54 respectively, other kinds of settings or operations necessary for the measurement must be executed by hand. Therefore, since there is a strong probability that mistakes or variations can occur in such hand-operated operations, not only the measurement cannot be done with high accuracy but also the number of steps to be operated by hand increases to thereby increase the cost for the exhaust gas component measuring apparatus 51.

For example, as shown in FIG. 5, the LA-4 mode test, in California of USA provides that, while switching a vehicle driving mode sequentially to a CT mode (a low temperature acceleration mode) for a given time, a CS mode (a low temperature gentle acceleration mode) for given time, a soak mode (a stop mode) for a given time, and an HT mode (a high temperature acceleration mode) for a given time, the components of the exhaust gas of the vehicle should be measured. Therefore, before and after the soak mode, the on and off of the cooling fan 57, opening and closing of the bonnet 58, and on and off of the exhaust gas blower 60 and vehicle data measuring device 64 must be switched accurately at their respective given times.

Conventionally, these operations, as described above, are all carried out by an operator (human being). Therefore, it is unavoidable that, for example, the operator can forget to switch the on and off of the cooling fan 57, and the soak time can vary. Also, in case where a single person carries out two or more operations, there will be always produced a time lag between the operations. To prevent such time lag, it is necessary to provide the same number of operators as the number of items to be operated, which increases personnel costs to a rather great extent.

Especially, with regard to the opening and closing of the bonnet 58, unlike the other operations that can be remotely controlled, the operator must enter the housing to open and close the bonnet 58 directly. For this reason, a large operation time lag is easy to occur and further, as the operator enters and leaves the housing, the environment within the housing can vary. Further, depending on the kinds of tests, there is a fear that the operator can be exposed to severe conditions such as high and low temperatures, sun rays, and high positions (heights).

In addition, in the conventional exhaust gas component measuring apparatus 51, although detection of troubles in part of the apparatus 51 is automatically carried out by the failure sensor 62, the emergency stop of the device that corresponds to the occurrence of the trouble is carried out manually by an operator.

SUMMARY OF THE INVENTION

The present invention aims at eliminating the drawbacks found in the above-mentioned conventional exhaust gas component measuring apparatus. Accordingly, it is an object of the invention to provide an exhaust gas component measuring apparatus which is able to fully automatically measure the components of exhaust gas with ease, at a reduced low cost, and with enhanced efficiency and accuracy.

In attaining the above object, according to a first aspect of the invention, there is provided an exhaust gas component measuring apparatus which measures the components of the exhaust gas of a vehicle while driving the vehicle in a given driving mode, and comprises: driving mode setting means (for example, in the illustrated embodiment (which applies similarly hereinafter), control board 14) for setting the driving mode of the vehicle V; environment setting means (a cooling fan 7, and a bonnet opening and closing device 8) for automatically setting the environment of the vehicle V in accordance with the driving mode set by the driving mode setting means; a driving device (a robot 3) for automatically driving the vehicle V in such a manner that the vehicle V can be driven in the driving mode set; and, measuring devices (a CVS 11, an analyzing meter 13, and an operation device 15) respectively for automatically measuring the components of the exhaust gas of the vehicle as the vehicle V is automatically driven.

According to the present exhaust gas component measuring apparatus, in case where the driving mode of the vehicle is set by the driving mode setting means, the environment setting means automatically sets up the environment of the vehicle, the driving device automatically drives the vehicle V in such a manner that the vehicle V can be driven in the driving mode set, and, as the vehicle V is automatically driven, the measuring devices automatically measure the components of the exhaust gas of the vehicle. As described above, in the present apparatus, after its operation is started, the environment setting and driving of the vehicle corresponding to the set driving mode as well as the measurement of the components of the exhaust gas can be carried out fully automatically; and, therefore, while eliminating artificial operation mistakes as well as time variations and time lags, the measurement of the components of the exhaust gas can be executed easily, at a reduced low cost, and with enhanced efficiency and accuracy.

Also, according to a second aspect of the invention, in the exhaust gas component measuring apparatus according to the first aspect of the invention, the environment setting means includes bonnet opening and closing means (bonnet opening and closing device 8) for automatically opening and closing a bonnet B according to the set driving mode.

According to the present exhaust gas component measuring apparatus, since the bonnet opening and closing means automatically opens and closes the bonnet B according to the set driving mode, an operation to open and close the bonnet, which has been difficult in the conventional exhaust gas component measuring apparatus, can be carried out automatically. Therefore, the measurement of the components of the exhaust gas can be executed with no need for an operator to enter the inside of a housing for storing the vehicle therein. As a result of this, there can be positively eliminated fears that the environment within the housing can be changed by an operator entering and leaving the housing, and that, depending on the kinds of tests, the operator can be exposed to severe conditions such as high and low temperature, sun rays, and high positions (heights).

Further, according to a third aspect of the invention, in the exhaust gas component measuring apparatus according to the second aspect of the invention, the bonnet opening and closing means is composed of an actuator 10 disposed within an engine room ER which can be opened and closed by the bonnet 8.

According to the present exhaust gas component measuring apparatus, since the bonnet opening and closing means is composed of the actuator which is disposed within the engine room, when compared with a case in which the bonnet opening and closing means is installed in the outside of the vehicle, especially, the mounting of the bonnet opening and closing means can be adjusted easily according to differences between the sizes of vehicles, thereby being able to obtain high versatility. At the same time, when moving the vehicle after the measurement of the components of the exhaust gas of the vehicle is completed, there is eliminated the need to remove the actuator from the vehicle, thereby being able to enhance the efficiency of the measurement.

Moreover, according to a fourth aspect of the invention, in the exhaust gas component measuring apparatus according to any one of the first to third aspects of the invention, there are further included abnormal condition detect means (failure sensor 16) for detecting the abnormal condition of the environment of the vehicle V and/or the abnormal condition of the driving state of the vehicle V, and emergency stop means (control board 14) for automatically stopping the vehicle automatic driving by the driving device in case where any abnormal condition is detected by the abnormal detect means.

According to the present exhaust gas component measuring apparatus, in case where the abnormal condition of the environment of the vehicle and/or the abnormal condition of the driving state of the vehicle, the emergency stop means automatically stops the automatic driving of the vehicle by the driving device. Therefore, in case where any abnormal condition occurs, the driving device can be stopped positively.

BRIEF DESCRIPTION OF THE DRAWINGS

FIGS. 4A to 4C are schematic views of an actuator used in the bonnet opening and closing device shown in FIGS. 3A and 3B, showing three ways of arrangement of the actuator;

FIG. 5 is a time chart when the LA-4 mode test is conducted;

DETAILED DESCRIPTION OF THE PREFERRED EMBODIMENTS OF THE INVENTION

Figure 1:
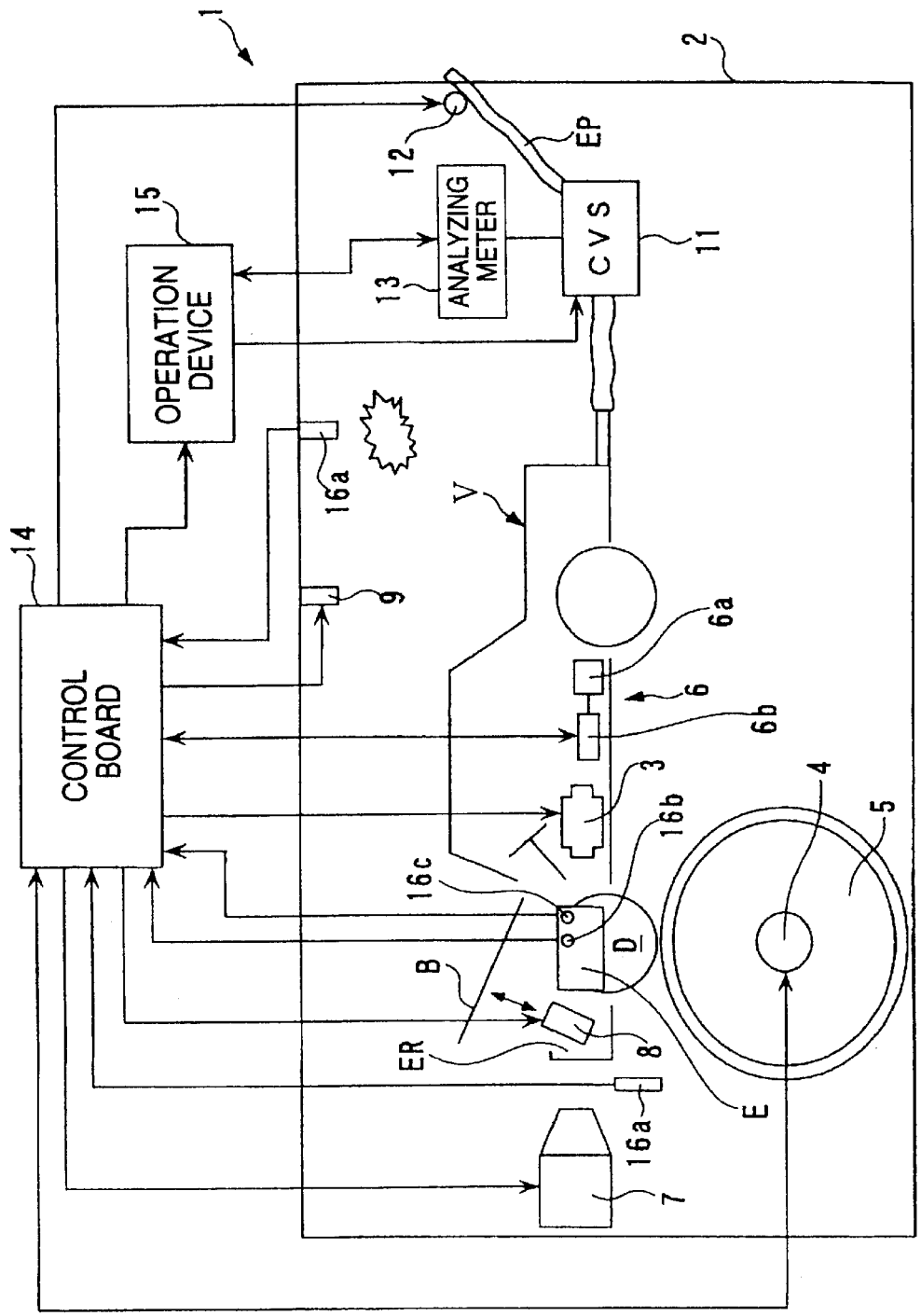
FIG. 1 is a structure view of an exhaust gas component measuring apparatus according to an embodiment of the invention.
Figure 2:
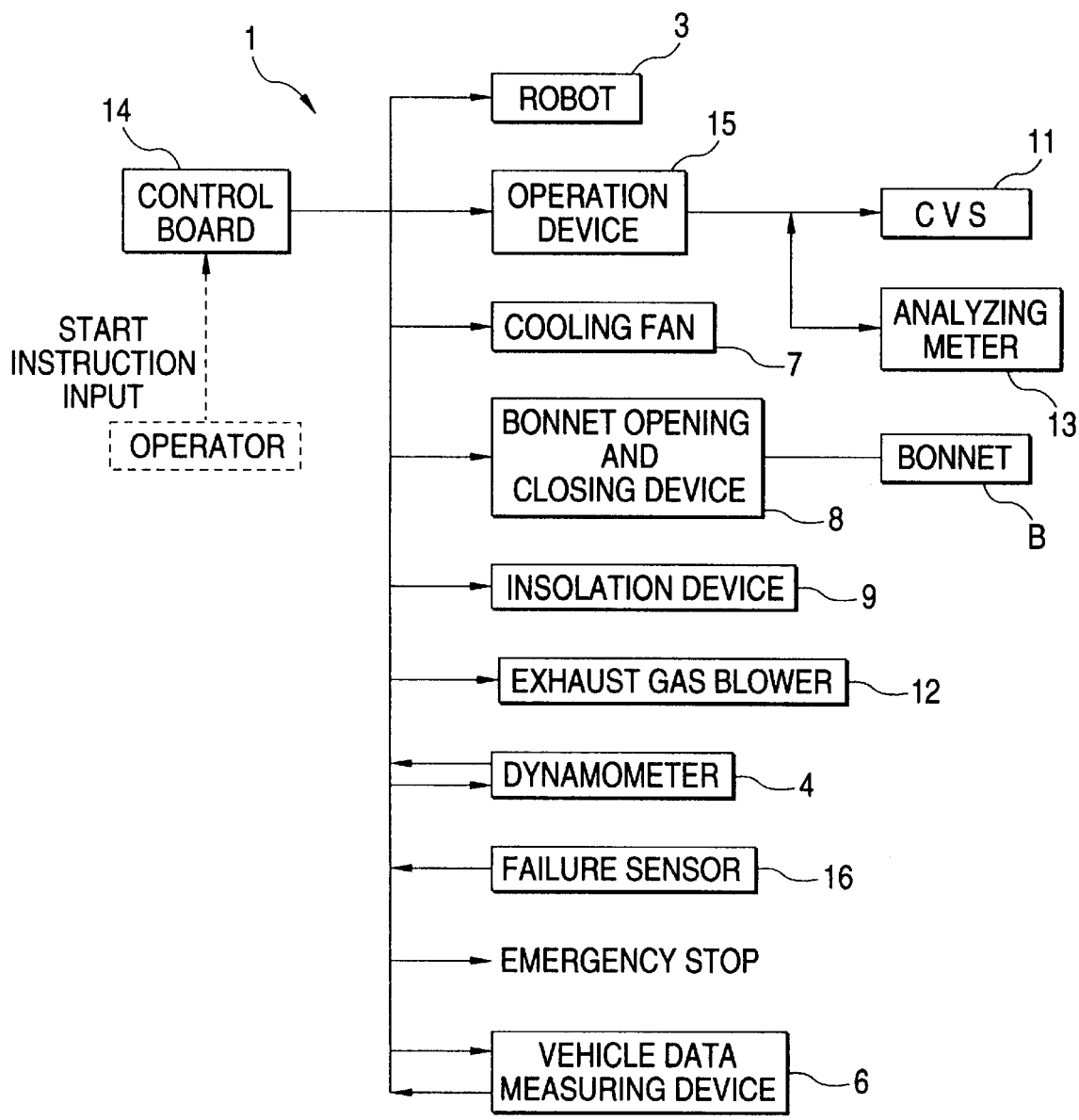
FIG. 2 is a block diagram of a control system employed in the exhaust gas component measuring apparatus shown in FIG. 1.

Now, a description will be given below of a preferred embodiment according to the invention with reference to the accompanying drawings. FIGS. 1 and 2 respectively show the structure of an exhaust gas component measuring apparatus 1 according to the present embodiment of the invention.

The present exhaust gas component measuring apparatus 1 stores a vehicle (a vehicle to be tested) V into a housing 2 and, while driving automatically the vehicle V in a given driving mode, measures the components of exhaust gas discharged from the vehicle V during such automatic driving of the vehicle V. In the driving seat of the vehicle V, there is installed a robot 3 (a driving device) which is used to automatically drive the engine E of the vehicle V. The robot 3 includes an actuator (not shown) for driving the starter and accelerator (neither of them is shown) and, under the control of a control board 14 to be discussed later, is allowed to drive the engine E automatically in a given driving mode. The driving wheel D of the vehicle V is placed on a roller 5 of a dynamometer 4 of a 1-roller type, while the dynamometer 4 can be operated under the control of the control board 14 to thereby secure the running state of the vehicle V which corresponds to a driving mode specified. Also, in the inside of the vehicle V, there is disposed a vehicle data measuring device 6 which is composed of an ECU 6a and a data take-in device 6b, so that vehicle data such as the number of revolutions of the engine E measured by the data measuring device 6, together with data on the number of revolutions of the roller 5 of the dynamometer 4, can be sent to the control board 14.

Also, the exhaust gas component measuring apparatus 1 includes, as environment setting means for setting the environment of the vehicle V, a cooling fan 7, a bonnet opening and closing device 8 (bonnet opening and closing means), and an insolation device 9. The cooling fan 7 is disposed in front of the engine E and blows air to the engine E to thereby cool the engine E, while on and off of the cooling fan 7 is controlled by the control board 14. The insolation device 9 is disposed upwardly of the vehicle V and, when measurement is executed under the insolation condition, it applies sun rays directly to the vehicle V to thereby heat it; and, on and off of the insolation device 9 is also controlled by the control board 14.

Figure 3A:
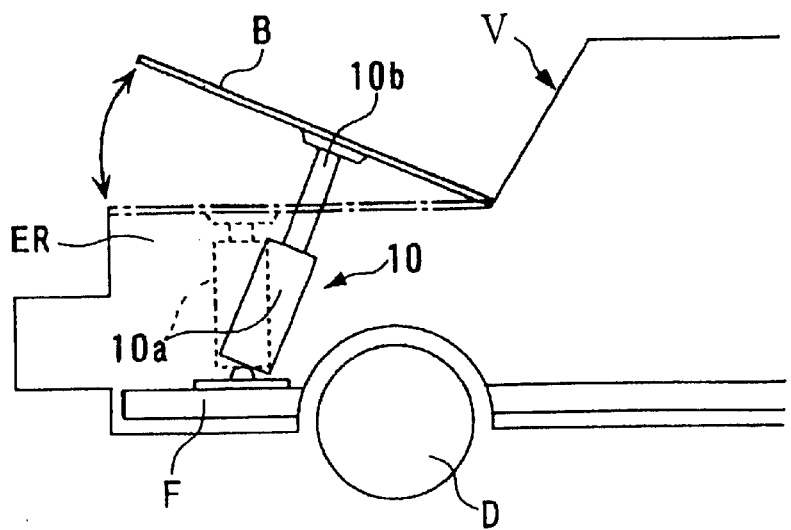
FIGS. 3A and 3B are schematic side views of a bonnet opening and closing device employed in the above control system, showing two ways of arrangement of the bonnet opening and closing device.
Figure 3B:
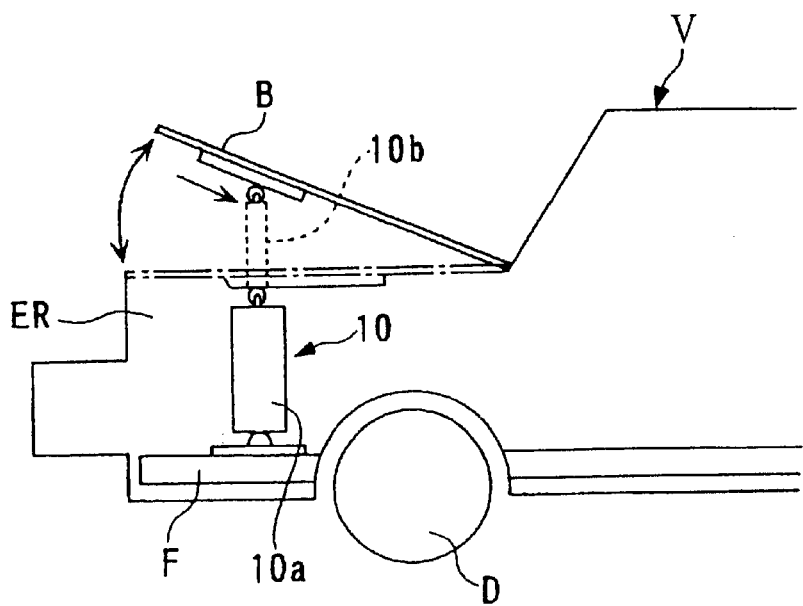

The bonnet opening and closing device 8 is a device which, while the cooling fan 7 is in operation, opens the bonnet B of the vehicle V in order to secure the cooling performance of the cooling fan 7. As shown in FIGS. 3A and 3B, the bonnet opening and closing device 8 is composed of an actuator 10 which is disposed within an engine room ER. The actuator 10 includes a cylinder 10a to be mounted on the frame F of the vehicle V, a piston 10b which can be expanded and contracted in the vertical direction with respect to the cylinder 10a and is coupled to the bonnet B, and a motor 10c (see FIG. 4) which drives the piston 10b through a ball and screw mechanism (not shown). The operation of the motor 10c is controlled by the control board 14 to thereby expand and contract the piston 10b, so that the bonnet B can be opened and closed. By the way, the locking state of a lock device (not shown), which is used to lock the bonnet B during the normal running operation of the vehicle V, is released during the present measurement.

By the way, FIGS. 3A and 3B show two installation cases for installing the actuator 10. That is, FIG. 3A shows a free-type installation case where the cylinder 10a can be freely rotated with respect to the frame F and the piston 10b is fixed to the bonnet B. On the other hand, FIG. 3B shows a fixed-type installation case where the cylinder 10 is fixed to the frame F and the piston 10b is contacted with the bonnet B. Also, FIGS. 4A to 4C show three types of the actuator 10 itself. That is, FIG. 4A shows a one-side expansion type in which the piston 10b can be expanded and contracted in a single stage on one side thereof. FIG. 4B shows a one-side multi-stage expansion type in which the piston 10b can be expanded and contracted in two stages on one side thereof. FIG. 4C shows a double-side expansion type in which the piston 10b can be expanded and contracted on the two sides thereof.

Also, on the exhaust pipe EP of the vehicle V, there is mounted a CVS 11 (a measuring device); on the downstream side of the CVS 11, there is disposed an exhaust gas blower 12; and, an analyzing meter 13 (a measuring device) is connected to the CVS 11. The CVS 11 incorporates therein a plurality of (in the present embodiment, No. 1 to No. 6, that is, 6 pieces of) bags (not shown) and samples the exhaust gas of the vehicle V and the atmospheres thereof into the respective bags, whereas the analyzing meter 13 analyzes the components of the exhaust gas sampled. Also, the exhaust gas blower 12 is used to exhaust forcibly the remaining the exhaust gas that are not sampled.

The control board 14 (driving mode setting means and emergency stop means) includes an input key (not shown) through which instructions for the specification of the kind of measurement to be carried out and the start of the measurement can be input, and a microcomputer (not shown). The control board 14 not only sets a driving mode in accordance with the kind of measurement specified through the input key but also outputs drive signals to the above-mentioned robot 3, dynamometer 4, cooling fan 7, and bonnet opening and closing device 8 in accordance with the driving mode set, thereby controlling the operations of these components. Also, to the control board 14, there is connected an operation device 15 (a measuring device) which consists of a microcomputer. The operation device 15 not only controls the CVS 11 and analyzing meter 13 in accordance with control signals from the control board 14 but also operates the measured results of the components of the exhaust gas using data output from the analyzing meter 13.

Further, the exhaust gas component measuring apparatus 1 includes a failure sensor 16 which is used to detect abnormal conditions or troubles occurring in the present apparatus 1. In the present embodiment, as the failure sensor 16, there are disposed a blow-out sensor 16a for detecting the present or absence of the blow-out of the tire of the driving wheel D, an oil temperature sensor 16b and a water temperature sensor 16c respectively for detecting the oil temperature and water temperature of the engine E, and a fire sensor 16d for detecting the occurrence of a fire within the housing 2; and, the detect signals of these sensors are respectively transmitted to the control board 14. When at least one of these detect signals points out an abnormal condition, the control board 14 stops the operation of the robot 3 to thereby stop the measuring operation.

Next, a description will be given below of the operation of the above-structured exhaust gas component measuring apparatus 1 with reference to FIG. 5, while taking the case of the LA-4 mode test. At first, in case where, through the input key of the control board 14, there is input an instruction that measurement should be made according to the LA-4 mode test, prior to start of the measurement, test conditions corresponding to the LA-4 mode test are set by the operation device 15 and, under the control of the operation device 15, the CVS 11 is dumped, that is, the bags of the CVS 11 are all emptied by vacuum; and, at the same time, the exhaust gas blower 12 is previously operated on by the control board 14.

Next, in case where, through the input key of the control board 14, there is input an instruction that the measurement should be started, under the control of the control board 14, the measurement is started (a time t0 in FIG. 5). That is, as the robot 3 and dynamometer 4 start their operations for a CT mode, the vehicle V is operated in the CT mode and, at the same time, the cooling fan 7 is operated on, the bonnet B is opened by the bonnet opening and closing device 8, and the vehicle data measuring device 6 is operated on. Simultaneously with this, under the control of the operation device 15, the CVS 11 samples the exhaust gas of the vehicle V and the atmosphere thereof into No. 1 and No. 4 bags respectively, the analyzing meter 13 analyzes successively the components of the exhaust gas sampled, and the operation device 15 performs modal measurement, that is, performs calculations for the respective times set according to the CT mode.

Next, when a given time (505 seconds) has passed since the start of the measurement and there comes the time of end of the measurement (time t1) for the CT mode, in accordance with control signals from the control board 14, the operations of the robot 3 and dynamometer 4 are switched over to those for a CS mode, so that the driving mode of the vehicle V is switched over to a CS mode of a given time (867 seconds). During the CS mode, the on state of the cooling fan 7 and the opened state of the bonnet B are maintained; and, on the other hand, the CVS 11 samples the exhaust gas and atmosphere thereof into the No. 2 and No. 5 bags respectively, the analyzing meter 13 executes the successive analysis, and the operation device 15 executes the modal measurement.

After then, when the CS mode continues for the given time and there comes the time of end of the CS mode (time t2), the robot 3 and dynamometer 4 are stopped, so that the driving mode of the vehicle V is switched over to a soak mode of a given time (600 seconds). With this transition of the vehicle V driving mode to the soak mode, the cooling fan 7 is turned off, the bonnet B is closed by the bonnet opening and closing device 8, and the exhaust gas blower 12 and vehicle data measuring device 6 are also turned off. Also, during the soak mode, the analyzing meter 13 analyzes the components of the exhaust gas and atmospheres that have been sampled into the No. 1, 2, 4 and 5 bags of the CVS 11 up to that time, and the operation device 15 reads the results analyzed by the analyzing meter 13.

Next, when there comes the time of end of the soak mode (time t3), the robot 3 and dynamometer 4 starts their respective operations for a HT mode, with the result that the driving mode of the vehicle V is switched over to a HT mode of a given time (505 seconds). With this transition of the vehicle V driving mode to the HT mode, the cooling fan 7 is turned on again, the bonnet B is opened by the bonnet opening and closing device 8, and the exhaust gas blower 12 and vehicle data measuring device 6 are also turned on. Also, the CVS 11 samples the exhaust gas of the vehicle V and the atmosphere thereof into No. 3 and No. 6 bags respectively, the analyzing meter 13 analyzes successively the components of the exhaust gas sampled, and the operation device 15 performs the modal measurement.

Next, when there comes the time of end of the HT mode (time t4), the robot 3 and dynamometer 4 are respectively stopped, and the vehicle data measuring device 6 is also turned off. Also, the analyzing meter 13 analyzes the exhaust gas and atmosphere thereof sampled into the No. 3 and No. 6 bags of the CVS 11, the operation device 15 reads the analysis results obtained by the analyzing meter 13 to thereby find the final calculation values of the components of the exhaust gas, and the thus found final calculation values are printed out by a printer (not shown). Also, the CVS 11 is dumped and the analyzing meter 13 is purged (degassed), thereby preparing for the next measurement.

Also, during the above measurement, the control board 14 always monitors the detect signals of the failure sensor 16, that is, the detect signals of the blow-out sensor 16a, oil temperature sensor 16b, water temperature sensor 16c and fire sensor 16d and, when at least one of these detect signals points out an abnormal condition, the control board 14 emergency stops the robot 3 and other components to thereby stop the measurement.

As described above, in the exhaust gas component measuring apparatus 1 according to the present embodiment, as shown in FIG. 2, after the measurement is started through the operation of the input key of the control board 14, setting of the driving mode by the control board 14, setting of the environment of the vehicle V such as on and off of the cooling fan as well as opening and closing of the bonnet B, driving of the vehicle V by the robot 3 and dynamometer 4, and measurement of the components of the exhaust gas by CVS 11, the analyzing meter 13 and operation device 15 can be carried out fully automatically. Therefore, while eliminating the artificial operation mistakes as well as time variations and time lags that have been unavoidable in the conventional exhaust gas component measuring apparatus 51, the measurement of the components of the exhaust gas can be made accurately.

Also, since, after the measurement is started, the measurement can be executed fully automatically, the number of steps to be executed by human beings can be reduced greatly, which makes it possible to reduce the cost in the exhaust gas component measuring apparatus 1. Also, for the same reason, the efficiency of the measurement can be enhanced greatly: for example, in the LA-4 mode test, the number of times of measurement can be increased up to 8 per day (8 hours) when compared with the conventional exhaust gas component measuring apparatus 51 in which the maximum number of times of measurement is 6. Further, since the measurement of the components of the exhaust gas is carried out fully automatically, during the measurement, the attendant facilities of the exhaust gas component measuring apparatus 1, for example, illumination facilities are allowed to be off in operation, thereby being able to reduce the running cost of the exhaust gas component measuring apparatus 1 as well.

Further, in the exhaust gas component measuring apparatus 1 according to the present embodiment, especially, the bonnet opening and closing device 8 opens and closes the bonnet B automatically according to the driving mode of the vehicle V. Thus, the opening and closing of the bonnet, which has been difficult in the conventional exhaust gas component measuring apparatus, can be executed fully automatically. Thanks to this, the measurement of the components of the exhaust gas can be made achieved with no need for an operator to enter the inside portion of the housing 2. As a result of this, there can be positively eliminated fears that the environment within the housing 2 can be changed due to the operator's entering and leaving the housing 2 and also that the operator can be exposed to severe conditions such as high and low temperatures, sun rays and highland in accordance with the kind of the tests.

Figure 6:
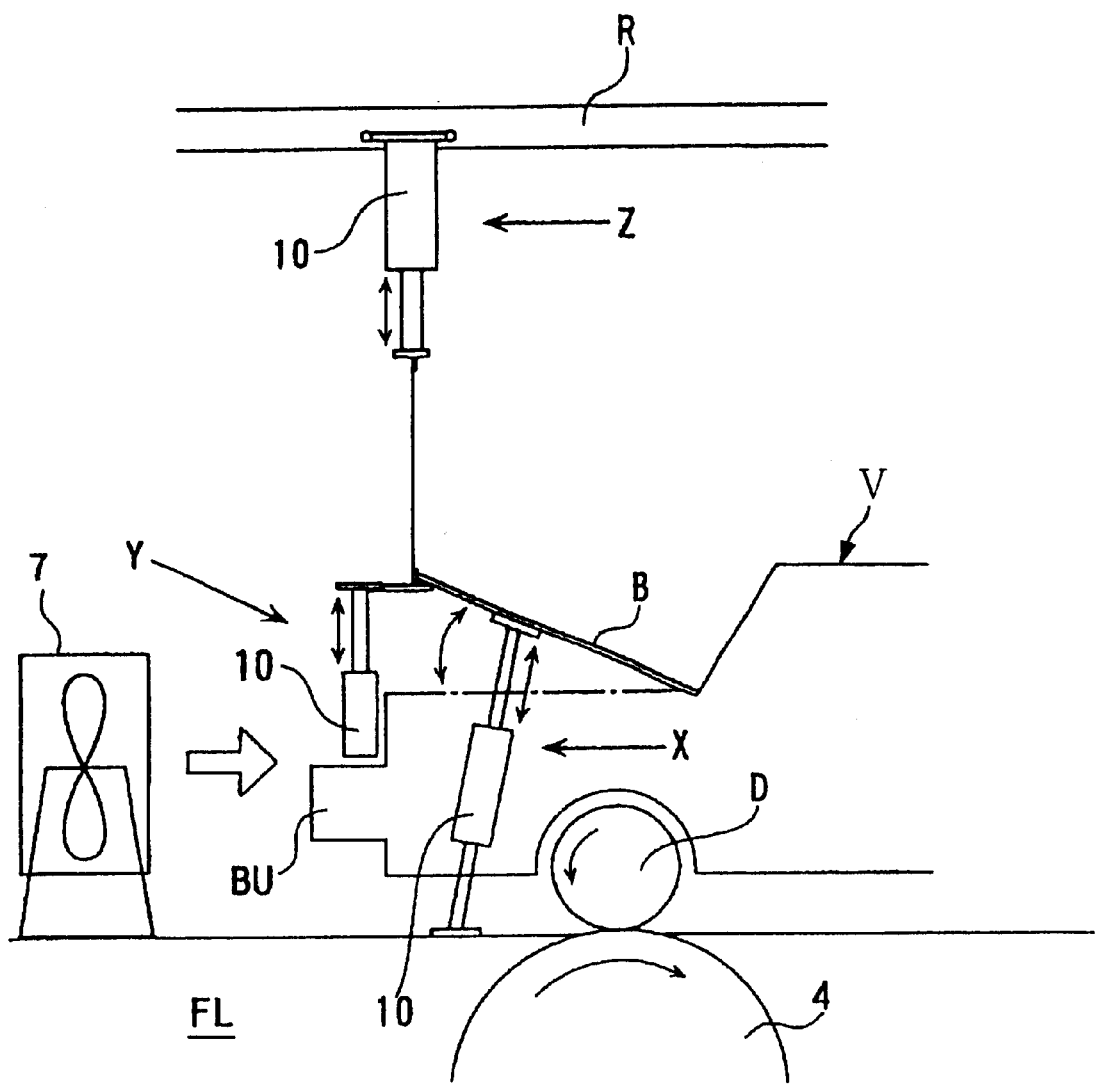
FIG. 6 is a schematic side view of the bonnet opening and closing device, showing three cases in which the bonnet opening and closing device is installed in the outside of a vehicle; and, FIG. 7 is a block diagram of the structure and control system of a conventional exhaust gas component measuring apparatus.
Figure 7:
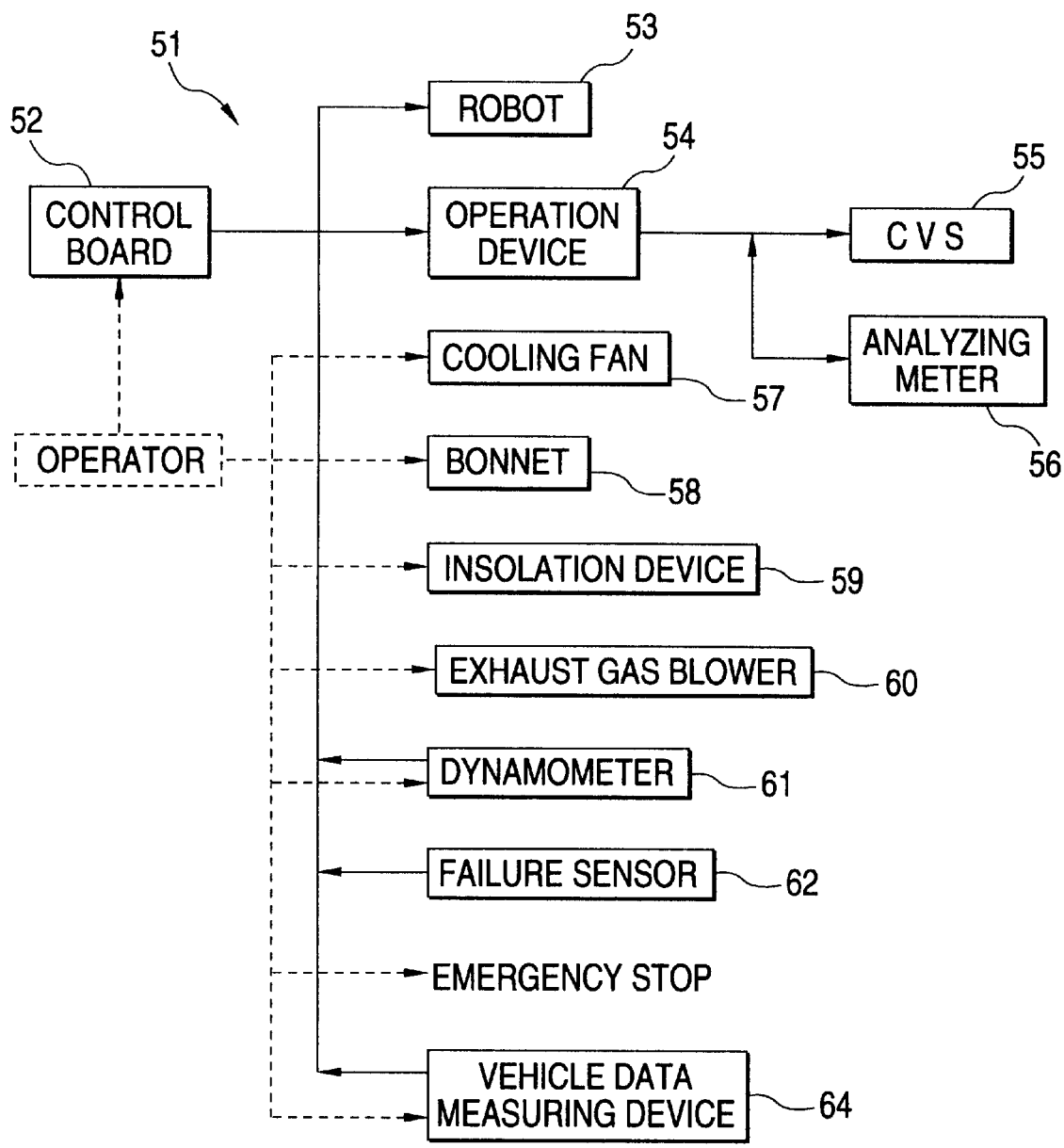

Moreover, in the exhaust gas component measuring apparatus 1 according to the present embodiment, due to the fact that the actuator 10 forming the bonnet opening and closing device 8 is disposed within the engine room ER, there can be obtained the following advantages. By the way, FIG. 6 shows three different cases at the same time in which the actuator 10 is installed in the outside of the vehicle V. A case shown by an arrow mark X represents a floor installed type in which the actuator 10 is placed on a floor FL. In this case, there is a fear that the distance between the bonnet B and floor FL in the vertical direction can vary according to the acceleration of the vehicle V and thus the bonnet B can be swung during the running operation of the vehicle V.

Also, an arrow mark Y shows a bumper mounted type in which the actuator 10 is mounted on a bumper BU. In this case, there are inconveniences that a cooling air from the cooling fan 7 can be disturbed and further the bumper BU can be damaged. Further, an arrow mark Z stands for a ceiling hanging type in which the actuator 10 hangs down from a ceiling rail R. In this type, since the distance between the bonnet B and ceiling rail R in the vertical direction varies greatly according to the kinds of the vehicle V, the versatility of this type is low. Also, in the floor installed type shown by X and ceiling hanging type shown by Z, when moving the vehicle V after end of the measurement, there is necessary an operation to remove the actuator 10 from the vehicle V and thus the efficiency of the measurement is lowered by an amount corresponding to this removing operation and, at the same time, when the vehicle V is moved while the operator forgets to remove the actuator 10 from the vehicle V, there is a fear that the vehicle V can be damaged.

On the other hand, according to the present embodiment, by disposing the actuator 10 within the engine room ER, there can be eliminated all of the above-mentioned inconveniences caused when the actuator 10 is disposed in the outside of the vehicle V. Especially, because the mounting of the actuator 10 can be adjusted easily according to the different sizes of the vehicle V, there can be obtained high versatility and, at the same time, there is eliminated the need to remove the actuator 10 from the vehicle V when moving the vehicle V after end of the measurement, the efficiency of the measurement can be enhanced.

By the way, the present invention is not limited to the above described embodiment but it can be enforced in other various embodiments. For example, in the illustrated embodiment, a description has been given of a case where the components of the exhaust gas is measured according to the LA-4 mode test. However, the exhaust gas component measuring apparatus 1 according to the present embodiment is not limited to such measurement but can also be applied similarly to various kinds of exhaust gas measurement such as measurement according to the 10–15 mode test, measurement according to an insolation test, and other various kinds of measurement under other different conditions, simply by changing the control program for controlling the operation of the present apparatus 1.

Also, as the environment setting means for setting the environment of the vehicle V and as the abnormal condition detecting means for detecting the abnormal conditions of the vehicle V, there may be added other elements than those illustrated in the present embodiment. In this case, the elements added may be automatically controlled. And, the structures of the detailed parts of the embodiment can also be changed without departing from the scope and spirit of the invention.

As has been described heretofore, an exhaust gas component measuring apparatus according to the present invention provides an effect that it is able to fully automatically measure the components of the exhaust gas of a vehicle easily, at a low cost, and with enhanced efficiency and accuracy.

What is claimed is:

1. An exhaust gas component measuring apparatus for measuring components of exhaust gas of a vehicle while driving the vehicle in a given driving mode, said exhaust gas component measuring apparatus comprising:

driving mode setting means for setting the driving mode of said vehicle;

environment setting means for automatically setting an environment of said vehicle in accordance with said driving mode set by said driving mode setting means;

a driving device automatically driving said vehicle in said set driving mode; and, a measuring device automatically measuring the components of the exhaust gas of said vehicle in association with the automatic driving of said vehicle.

2. An exhaust gas component measuring apparatus as set forth in claim 1, wherein said environment setting means includes bonnet opening and closing means for automatically opening and closing a bonnet in accordance with said set driving mode.

3. An exhaust gas component measuring apparatus as set forth in claim 2, wherein said bonnet opening and closing means is constructed by an actuator disposed within an engine room which is opened and closed by said bonnet.

4. An exhaust gas component measuring apparatus as set forth in claim 1, further comprising:

abnormal condition detect means for detecting at least one of the abnormal condition of the environment of said vehicle and the abnormal condition of the driving state of said vehicle; and, emergency stop means for automatically stopping said vehicle automatic driving by said driving device when at least one of the abnormal conditions is detected by said abnormal condition detect means.

5. An exhaust gas component measuring apparatus as set forth in claim 1, wherein said environment setting means includes a cooling fan disposed in front of an engine.

6. An exhaust gas component measuring apparatus as set forth in claim 1, wherein said environment setting means includes an insolation device provided above said vehicle for directly irradiating said vehicle.

7. An exhaust gas component measuring apparatus as set forth in claim 1, wherein said measuring device includes:

a CVS attached to an exhaust pipe of said vehicle;

an analyzing meter connected to said CVS; and an operation device controlling said CVS and said analyzing meter based on a control signal of said controller, and operating the components of the exhaust gas of said vehicle.

8. An exhaust gas component measuring apparatus for measuring components of exhaust gas of a vehicle while driving the vehicle in a given driving mode, said exhaust gas component measuring apparatus comprising:

a housing storing said vehicle;

a controller provided outside said housing, for setting the driving mode of said vehicle and an environment of said vehicle;

a driving device provided inside said housing, for driving said vehicle in said set driving mode;

an environment setting device provided inside said housing, for causing said vehicle to be exposed to said set environment; and a measuring device automatically measuring the components of the exhaust gas of said vehicle during the driving of said vehicle in said set environment, wherein said driving device and said environment setting device are automatically activated based on a control signal from said controller.

9. An exhaust gas component measuring apparatus as set forth in claim 8, wherein said environment setting device includes a bonnet opening and closing device automatically opening and closing a bonnet in accordance with said set environment of said vehicle.

10. An exhaust gas component measuring apparatus as set forth in claim 9, wherein said bonnet opening and closing device includes an actuator disposed within an engine room.

11. An exhaust gas component measuring apparatus as set forth in claim 8, further comprising:
    an abnormal condition detect device detecting at least one of the abnormal condition of the environment of said vehicle and the abnormal condition of the driving state of said vehicle; and,
    an emergency stop device automatically stopping said vehicle automatic driving by said driving device when at least one of the abnormal conditions is detected by said abnormal condition detect device.

12. An exhaust gas component measuring apparatus as set forth in claim 8, wherein said environment setting device includes a cooling fun disposed in front of an engine.

13. An exhaust gas component measuring apparatus as set forth in claim 8, wherein said environment setting device includes an insolation device provided above said vehicle for directly irradiating said vehicle.

14. An exhaust gas component measuring apparatus as set forth in claim 8, wherein said measuring device includes:
    a CVS attached to an exhaust pipe of said vehicle;
    an analyzing meter connected to said CVS; and
    an operation device controlling said CVS and said analyzing meter based on said control signal of said controller, and operating the components of the exhaust gas of said vehicle.

15. A method for measuring components of an exhaust gas of a vehicle while driving the vehicle in a given driving mode, said method comprising the steps of:
    setting the driving mode of said vehicle;
    automatically setting an environment of said vehicle in accordance with said driving mode;
    automatically driving said vehicle in said set driving mode; and
    automatically measuring the components of the exhaust gas of said vehicle in association with the automatic driving of said vehicle.

16. A method for measuring components of an exhaust gas of a vehicle while driving the vehicle in a given driving mode, said method comprising the steps of:
    storing said vehicle in a housing;
    setting the driving mode of said vehicle and an environment of said vehicle by the use of a controller provided outside said housing;
    driving said vehicle in said set driving mode by the use of a driving device provided inside said housing;
    exposing said vehicle to said environment by the use of an environment setting device provided inside said housing; and
    automatically measuring the components of the exhaust gas of said vehicle during the driving of said vehicle in said environment,
    wherein said driving step and said exposing step are automatically activated based on a control signal from said controller to said driving device and said environment setting device.

* * * * *